United States Patent [19]
Folsom et al.

[11] Patent Number: 5,501,489
[45] Date of Patent: Mar. 26, 1996

[54] FULLY EXTENDED PLEAT FOR PASSENGER AIR BAG FOLD

[75] Inventors: Marc D. Folsom, Tokyo, Japan; Donald J. Paxton, Brigham City, Utah

[73] Assignee: Morton International, Inc., Chicago, Ill.

[21] Appl. No.: 413,743

[22] Filed: Mar. 30, 1995

[51] Int. Cl.⁶ ................................................. B60R 21/16
[52] U.S. Cl. ................................................. 280/743.1
[58] Field of Search ........................ 280/743.1, 743.2, 280/732, 731, 728.1

[56] References Cited

U.S. PATENT DOCUMENTS

| | | | |
|---|---|---|---|
| 3,748,477 | 7/1973 | Wulbrecht | 280/150 AB |
| 4,351,544 | 9/1982 | Ross | 280/743 |
| 5,022,675 | 6/1991 | Zelenak, Jr. et al. | 280/743 |
| 5,140,799 | 8/1992 | Satoh | 280/743 |
| 5,178,407 | 1/1993 | Kelley | 280/743 |
| 5,290,061 | 3/1994 | Bollaert | 280/743 R |
| 5,348,341 | 9/1994 | Webber | 280/743.1 |
| 5,382,048 | 1/1995 | Paxton et al. | 280/743 R |

FOREIGN PATENT DOCUMENTS 3227420 6/1991 Japan.

Primary Examiner—Karin L. Tyson
Attorney, Agent, or Firm—A. Donald Messenheimer; Gerald K. White

[57] ABSTRACT

A fully extended pleat for a passenger side air bag cushion employs folds which extend fully across the folded cushion rather than terminating near the center of the folded cushion. A packing advantage of this fold is that there is no free volume or dead space between the pleats thereby reducing the pack size. A performance advantage is that surface friction between the pleats acts to retards somewhat the cushion deployment to reduce hitting and slapping of the occupants in the event of a crash. Finally, a process advantage is that the pleats do not have to be controlled to a specific depth, thereby allowing the folding mechanisms to be concerned only with the final width of the pleats and allowing one less control in the folding operation.

6 Claims, 3 Drawing Sheets

FULLY EXTENDED PLEAT FOR PASSENGER AIR BAG FOLD

This invention relates to air bag cushions for the passenger side of a vehicle, and more particularly to pleating of the sides of the cushion. It constitutes an improvement over a prior bag fold disclosed in U.S. Pat. No. 5,382,048 to Paxton et at. issued Jan. 17, 1995, the disclosure of which is hereby incorporated by reference

BACKGROUND OF THE INVENTION

Passenger side air bag cushions are usually much larger in volume than driver side cushions and present a number of special problem areas that are addressed in different ways by the various manufacturers. One problem area which has received considerable attention relates to the folding of the relatively massive amount of fabric of air bag cushion material into a compact size which can be mounted in an operational position that is also aesthetically acceptable. Many passenger cushion folds are accomplished by first tucking one portion of the cushion fabric into another portion of the same cushion. This has been accomplished in the past in a number of different orientations, two of which are shown in U. S. Pat. Nos. 5,022,675 to Zelenak et al. and 5,290,061 to Bollaeft. The various orientations of the fabric tucking, rolling and pleating have advantages for specific applications that are not addressed by the present invention.

When pleating is done as disclosed in the above patents, the inside edges of the pleats generally terminate near the center of the folded cushion. This usually results in pleats that extend laterally only pan of the way across the width of the folded air bag cushion. Space within the folded and uninflated cushion is therefore not efficiently utilized. One of the known aims for a well designed air bag cushion fold is to stop the cushion fabric from hitting or slapping the occupants as the cushion deploys during a crash due to non-uniform deployment action.

SUMMARY OF THE INVENTION

It is an object of this invention to provide a novel method of folding and rolling of an uninflated air bag cushion which provides a novel folded cushion that gives a very compact fit within the air bag module or housing, which the air bag cushion, while also giving superior performance with respect to occupant protection by impeding the speed at which the cushion unfolds and providing a more uniform deployment motion to reduce cushion fabric slapping.

Another object is to provide a novel air bag cushion which is easy to process in a production environment. While being similar to other folds in common use, one feature of the invention relates to folding of the bag fabric to a predetermined size with the cushion mouth attached to the open side of the housing. The folded bag is rolled at least about one half the distance toward the housing, stuffed into the mouth of the bag at the housing and a loop of fabric folded against the roll. Thereafter a protective cover is installed to hold the folded and rolled air bag cushion at the open side of the housing. Pleating of the sides or outer portion of the tucked fabric results in the pleats extending fully across the folded cushion, overlapping each other and interfacing with each other.

The packaging advantage of the novel fold is that there is a reduced amount of free volume or dead space between the pleats which would contribute to a larger folded cushion pack. Space in a passenger module is usually at a premium and any reduction of cushion pack volume is beneficial.

The performance advantage of this type of pleating is that pleats from one side of the cushion interact with pleats from the other side of the cushion. This interaction results in surface friction between the two sets of pleats during deployment. This friction between the fully overlapped pleats delays the rate at which the unfolding progresses thereby reducing the tendency of loose fabric slapping the occupant.

The process advantage of the invention is that the pleats do not have to be controlled to a specific depth at a position centrally located between opposite sides of the pleated cushion. When designing folding mechanisms, a major concern is with the width of the pleats and there is one less control in the folding operation.

These and other objects and advantages will become more fully apparent from the claims and from the detailed description as it proceeds in conjunction with the appended drawings.

DETAILED DESCRIPTION OF THE PREFERRED EMBODIMENT

Figure 1:
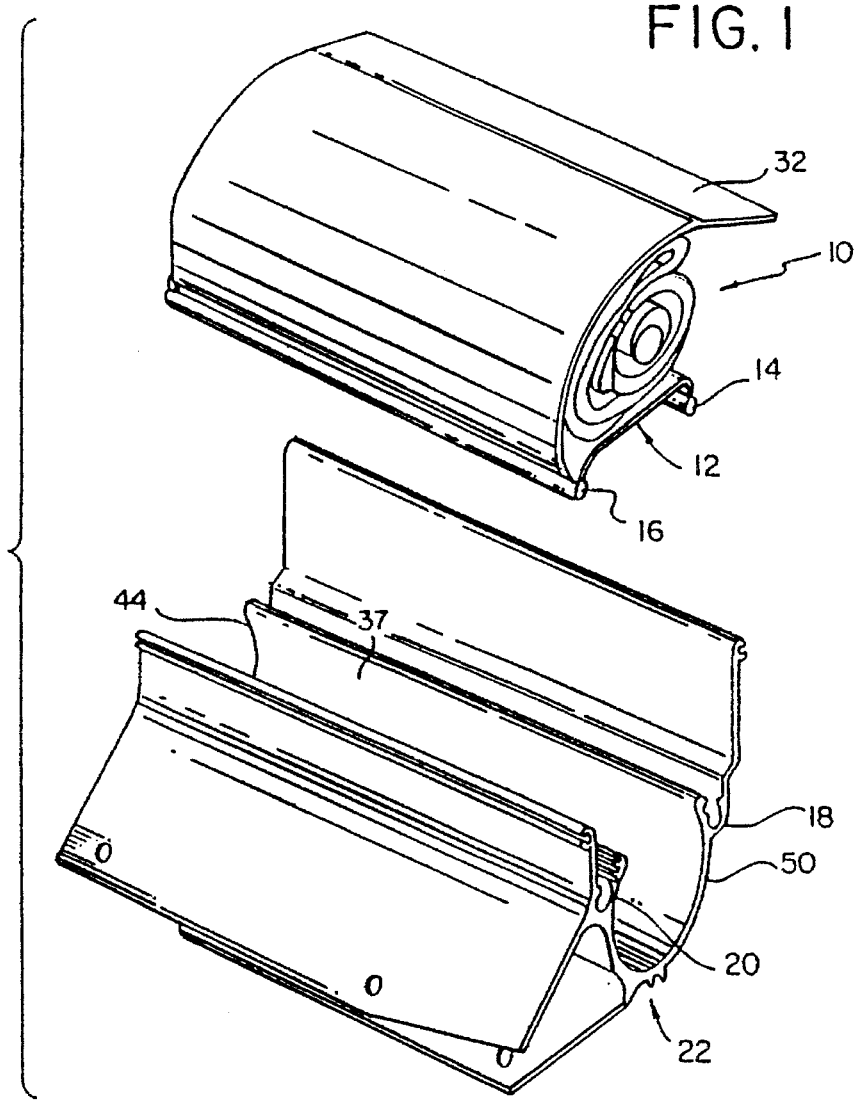
FIG. 1 is an exploded isometric view illustrating the folded and rolled air bag cushion of the present invention ready for being secured in a conventional module housing.

In inflatable air bag systems for restraining a passenger of a vehicle during a collision, a folded air bag cushion commonly is stored in a module mounted high on the dashboard of the vehicle. Upon the occurrence of a collision of the vehicle, the folded air bag cushion is inflated to restrain the passenger. The components used according to the present invention are not new, but the folded bag 10 as shown in FIG. 1 has been uniquely folded and rolled to the rectangular mouth 12 of the bag through which inflation gas passes. The marginal edges of the mouth 12 which extend along the longer sides of the mouth 12 may be defined by fabric fitted over rigid rods 14 and 16 that can be slid into slots 18 and 20 respectively that are formed in a housing 22.

Housing 22 may be formed as an aluminum extrusion having a horse shoe shaped profile shown in FIGS. 2–4 and 6–10 that is open on one side to be substantially congruent with the mouth 12 of the air bag cushion, with flanges 24 and 26 for mounting the housing in a vehicle and flanges 28 and 30 which may carry a protective cover 32 that is usually made of a commercially available material such as Tyvek. The open side 31 of housing 22 which is fitted to the mouth of air bag 10 may have a length of about 230 mm, for example, and a width of about 50 mm. The air bag cushion is about the same size. The pattern for the bag fabric is not critical, but the inflated size must be sufficient to reach to the passenger or passengers sitting in the front seat and the folding technique must allow the folded and rolled air bag cushion to fit approximately the size of the open side 31 of the housing as is evident from FIGS. 1 and 8–10.

Figure 2:
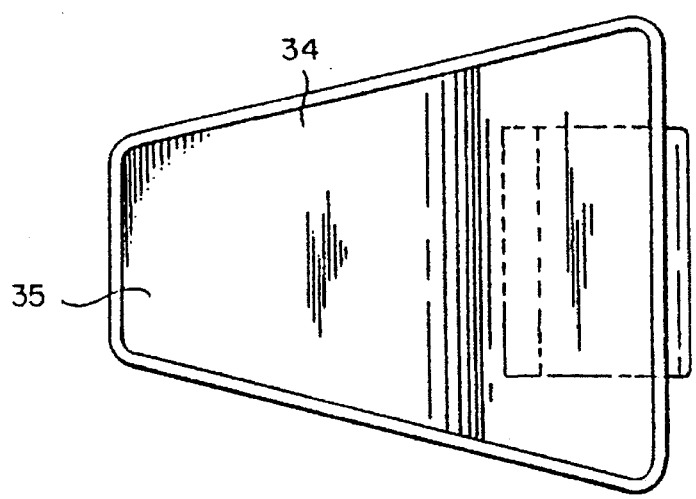
FIG. 2 is a top plan view of an uninflated cushion held in an open, cup-shaped condition before folding.
Figure 3:
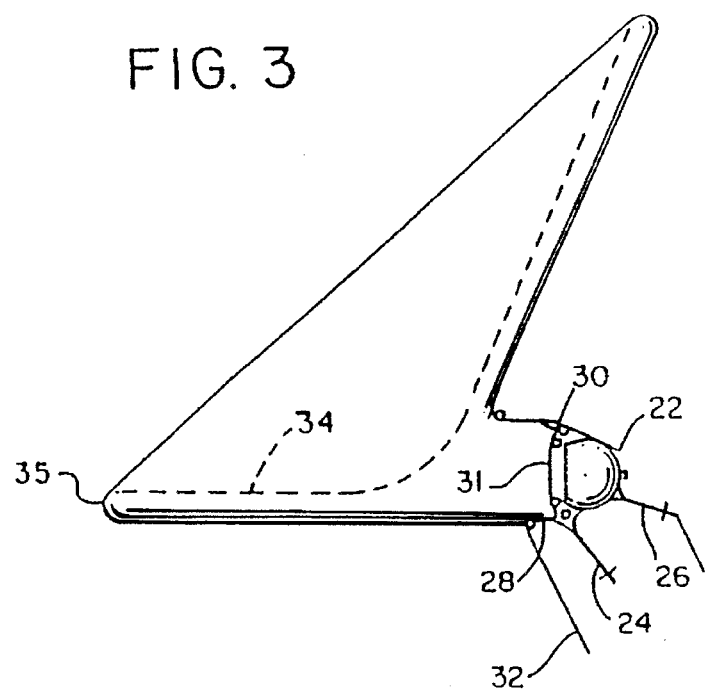
FIG. 3 is an elevation of the cushion shown in FIG. 2 and showing also the profile of the housing with which the folded and rolled air bag cushion is attached before installation into a vehicle.

The pattern of a typical uninflated bag cushion is generally evident from FIGS. 2 and 3. The housing 22 is shown attached to the mouth 12 of the bag 10 before folding and inverted for folding. The bottom panel 34 of the bag when inflated is up for reasons explained in the above-identified U.S. Pat. No. 5,380,048. The air bag cushion fold according to the invention is illustrated in FIGS. 4–10 and the folding and rolling may be carried out by hand or by a bag folding machine operating in accordance with the steps 1–6 as described hereinafter.

Step 1: Position the cushion fabric so that it will spread out and form a cup shape as is generally illustrated by FIGS. 2 and 3. The central portion 35 that is between top upper panel 37 and bottom or lower panel 34 narrows to a width that is slightly less than the length of the housing 22, which in the illustrated embodiment is about 230 mm. As is evident from FIG. 5, the fully extended pleats are used to produce a folded bag width that has a maximum width of about 230 mm.

Figure 4:
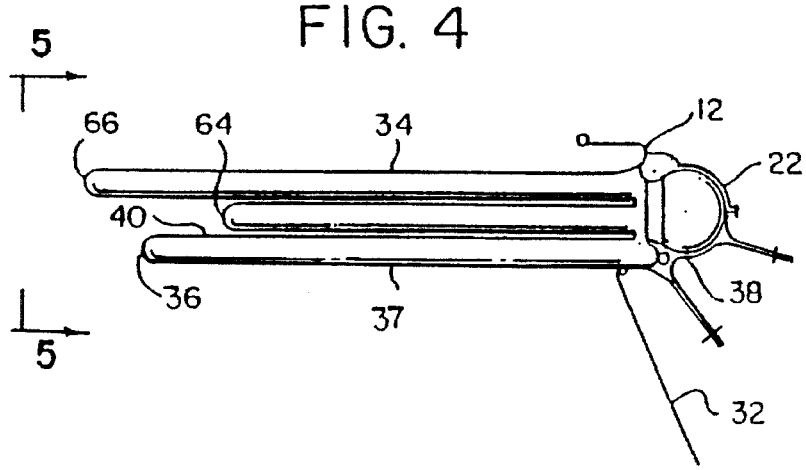
FIG. 4 is an elevation of the housing and the cushion of FIGS. 1–3 after being folded to the dimensions shown.
Figure 5:
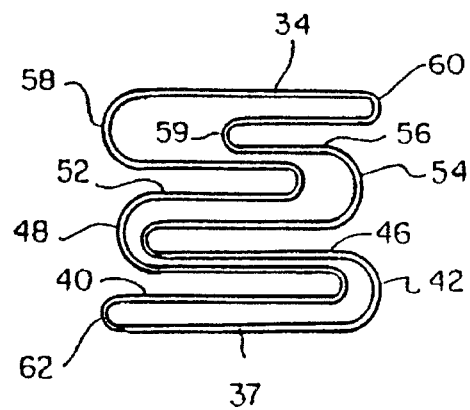
FIG. 5 is a left end elevation of the cushion as illustrated in FIG. 4 illustrating the pleats from the sides that extend completely across a final width of about 230 mm which may be the approximate width of the folded and rolled cushion as the cushion is inserted in the housing having a length also of about 230 mm.

Step 2: Form pleats and fold lines to have proportions as illustrated in FIGS. 4 and 5. (The height of and the spacings between the pleats in FIG. 5 are exaggerated for purposes of clarity). The first lateral fold line 36 representing the center portion of the cushion, is located at a first predetermined distance which in the illustrated embodiment is about 415 mm from the mouth 12 to position excess fabric from the bottom portion as viewed in FIG. 4 in a tuck which extends substantially all the way to the cushion mouth 12 to create a second lateral fold line 38 in the vicinity of the mouth 12.

A fully extended pleat may next be formed from, for example, the left side as seen in FIG. 5 by tucking in the excess fabric across the bottom tuck while the bottom tuck is held in place as by a first paddle, not shown. This paddle may be held in place by hand or by machine. By forcing a first blade, not shown, in a lateral direction across the upper panel 40 of the bottom portion tuck, all the way to be in substantial alignment with the first end 44 of the cushion housing 22 and a first marginal edge of the first paddle, a first longitudinal fold line 42 is provided. The fold line 42 is positioned to be in substantial alignment with the first end 44 of the cushion housing 22 and extends longitudinally substantially the entire distance between the first and second lateral fold lines 36 and 38.

A second fully extended pleat may next be formed from the opposite or fight side by tucking in the excess fabric across the upper panel 46 of the tuck having the fold line 42 to form a tuck having a second longitudinal fold line 48. The tuck having the fold line 42 may also be held in place by a blade which conveniently may be the first blade used for forming the tuck having the fold line 42. The fold line 48 is positioned to be in substantial alignment with the other end 50 of the cushion housing 22 (see FIG. 1) and a second marginal edge of the paddle and extends longitudinally substantially the entire distance between the first and second lateral fold lines 36 and 38. Frictional engagement exists between the entire overlapping surfaces of the two tucks having longitudinal fold lines 42 and 48.

A third fully extended pleat may next be formed again from the left side by tucking in the excess fabric remaining yet on the left side across the upper panel 52 of the tuck forming the fold line 48 to form a tuck having a generally longitudinal fold line 54. Because the pattern of the uninflated bag may be quite irregular, the ends of the longitudinal fold lines may be rounded; however, it is important that the longitudinal fold lines do not extend laterally beyond the ends 44 and 50 of the housing 22. The tuck having the fold line 48 may also be held in place by its blade, not shown. The third longitudinal fold line 54 is positioned to be in substantial alignment with the first end 44 of the housing 22 and generally parallel to fold line 42.

A fourth fully extended pleat is preferred where necessary to gather all of the remaining fabric in the air bag cushion within the volume illustrated in FIGS. 4 and 5. Such a fourth pleat is formed from the fight side again by forming a tuck which slides across the upper panel 56 while the upper panel is held in place as by its blade. A fourth longitudinal fold line 58 may be provided by working the available fabric to be in alignment with the second end 50 of housing 22. The interior longitudinal fold line 59 of the fourth pleat will be located at a position determined by the amount of fabric that remains after the fabric on the top layer 34 as viewed in FIG. 5 is stretched so that fold line 60 is aligned with fold lines 54 and 42, and also with the first end 44 of housing 22. Longitudinal fold lines 58, 48 and 62 are also in substantial alignment with the second end 50 of housing 22 so that the maximum width of the folded bag before rolling commences is no greater than the length of the housing 22 between ends 44 and 50.

By the foregoing structure, the pleats extend fully across the folded air bag cushion, overlapping each other and interfacing with each other. In contrast, the prior art practice in connection with pleating the sides or outer portions of the tucked fabric is to cause the inside edges or fold lines of the pleats to always terminate near the center of the folded cushion as is illustrated in U.S. Pat. No. 5,290,061 to Bollaert, FIGS. 10–12 and U.S. Pat. No. 5,022,675 to Zelenak et al., FIG. 13.

The packing advantage of the fold of the present invention is that free volume or dead space between the pleats is minimized thereby making a smaller pack possible. At the same time a performance advantage is achieved when the cushion is rolled as described below because of the interaction between the pleats from opposite sides of the cushion during deployment. In addition, the pleats do not have to be controlled to a specific depth during manufacture, thereby allowing the folding mechanism to be only concerned with the final width of the pleats.

Figure 6:
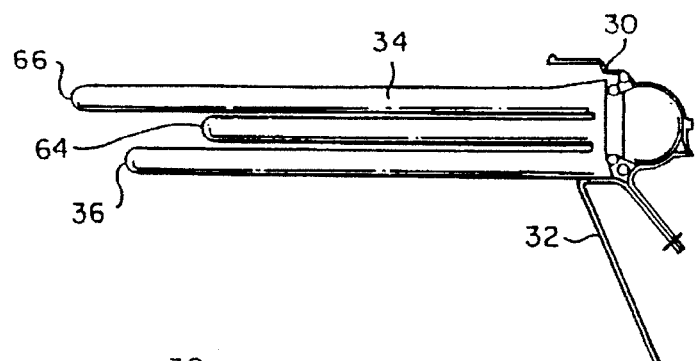
FIG. 6 is a view essentially identical to FIG. 4 except for showing the region between the fold lines at the ends of the shorter middle fold and the longer lower fold which is grasped along with the longest upper fold by a bag folding machine to start the roll as indicated in FIG. 7.

With reference to FIGS. 4 and 6, the ends of the folded and pleated bag has a lower lateral fold line 36 that is about 415 mm from the facing edge of the housing 22, a middle lateral fold line 64 at the same position or up to about 100 mm closer to housing 22 and an upper lateral fold line 66 which may be up to about 465 mm from the housing 22.

Figure 7:
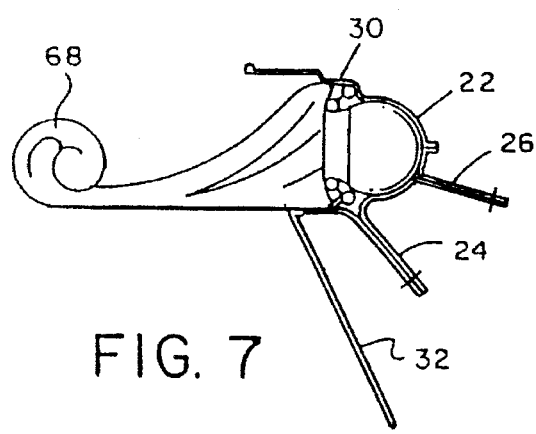
FIG. 7 illustrates the tight rolling of the fabric to a position more than half way toward the housing.

Step 3. Grasp the pleats in the 0–100 mm dimension as shown in FIG. 6 and roll the fabric tightly to about one half of the distance to, or about 200 mm from, the edge of the housing 22. This will produce a roll 68 having a diameter of about 75 mm as illustrated in FIG. 7.

Figure 8:
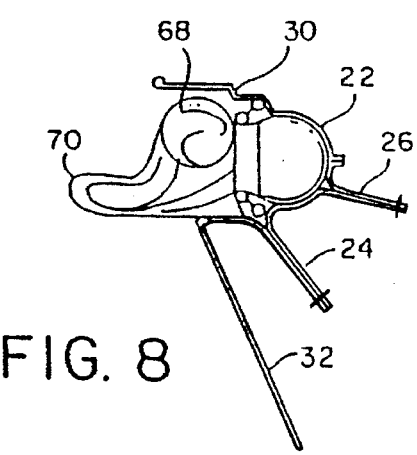
FIGS. 8–10 show the final three steps for positioning the roll against the front of, but not into, the housing.

Step 4. Advance the roll 68 of fabric to a position tightly against the air bag cushion fabric at mouth 12 that is secured to the open edge of housing 22 leaving a loop 70 of unrolled fabric that extends to a position about 95 mm from the edge of the housing 22 as is illustrated in FIG. 8.

Figure 9:
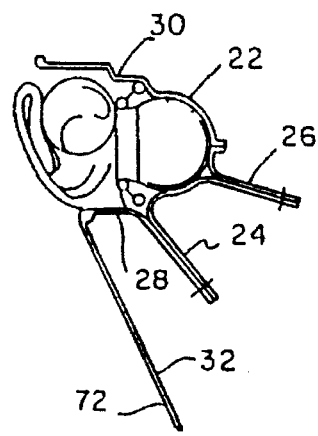

Step 5. Fold over the loop 70 of unrolled fabric as shown in FIG. 9 to have an overlap of about 60 mm with the exposed portion of roll 68. It should be noted that already a protective cover 32 having an adhesive 72 with a backing has been mounted on flange 28 of housing 22.

Figure 10:
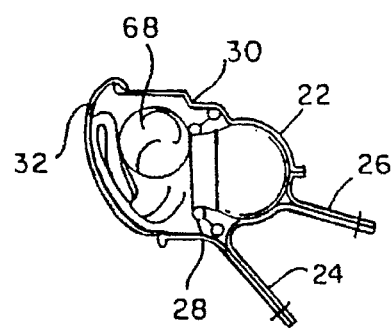

Step 6. Remove the backing from the adhesive 72 on protective cover 32. Pull the cover 32 tightly over the cushion fabric. Adhere the edge of the cover 32 to the opposite side of the housing as shown in FIG. 10. The module is now ready for installation in a vehicle and connection to the other parts of a passenger restraint system.

The performance advantage of the present invention is that the pleats from one side of the cushion interact with the pleats from the other side of the cushion. This interaction results in surface friction between the two sets of pleats. This friction between the fully overlapped pleats impedes the unfolding of the cushion thereby reducing the likelihood of loose fabric slapping the occupant. From the packaging standpoint, the free volume or dead space between pleats is minimized. From the manufacturing standpoint, the pleats do not have to be controlled to a specific depth less than the full width of the housing thereby allowing the folding mechanisms to be concerned with only the final width of the pleats.

With this description of the invention in detail, those skilled in this art will appreciate that modifications made not only in size, but aim in other ways be made without departing from the spirit thereof. Therefore it is not intended that the scope of the invention be limited to the specific embodiment that has been illustrated and described. Rather, it is intended that the scope of the invention be determined by the scope of the claims, bearing in mind that the reference numerals used in the claims are not to be construed as limiting in any way.

What is claimed is:

1. A method of folding an inflatable air bag cushion made of an air bag fabric and having a rectangular mouth that is attached to a cushion housing having an open side that has a length corresponding to the width of the bag mouth comprising the steps, with the cushion initially unfolded and uninflated and positioned with the bag bottom panel (34) facing up, of:

a. positioning the cushion fabric so that it forms a cup shape with the bag mouth (12) held in position at the open side of said housing (22) to locate a first lateral fold line (36) which forms a center portion adapted to face a passenger seating position when said cushion is installed in a vehicle and inflated, said first fold line being located at a predetermined position from said mouth and creating a second lateral fold line (38) in the vicinity of said mouth;

b. forming fully extended pleats from opposite sides on a sequential basis by:

i. tucking one side of unrolled cushion fabric in a first lateral direction to form a first tuck having a first longitudinal fold line (42) positioned to be in substantial alignment with a first end (44) of the housing and extending longitudinally substantially the entire distance between the first and second lateral fold lines (36) and (38);

ii. tucking the other side of the unrolled cushion fabric in a second lateral direction opposite the first lateral direction across an upper panel (46) of the first tuck to form a second tuck having a second fold line (48) positioned to be in substantial alignment with a second end (50) of said cushion housing and extending longitudinally substantially the entire distance between said first and second fold lines (36) and (38);

iii. tucking again the first side of the unrolled cushion fabric in said first lateral direction across an upper panel (52) to form a third longitudinal fold line (54) to be in substantial alignment with said first end of said cushion housing; and iv. tucking again the second side of the unrolled cushion fabric in said second lateral direction across an upper panel (56) of the last mentioned tuck to form a fourth longitudinal fold line (58) to be in substantial alignment with the second end (50) of the housing;

c. rolling the folded fabric of the cushion toward the mouth of the cushion stopping at a second predetermined position from mouth (12);

d. placing the rolled cushion at the cushion mouth while leaving a loop of excess fabric protruding from the housing;

e. folding the excess fabric over the cushion roll to form an overlap; and f. applying a protective member that is carried by the housing and presses against the overlap that maintains the folded and rolled cushion in said housing.

2. The method of claim 1 wherein the rolling of the cushion is stopped at a position about 200 mm from the cushion mouth and the diameter of the cushion roll is larger than the width of the cushion mouth.

3. The method of claim 2 wherein the length of said loop is about 95 mm when the cushion roll is placed at the cushion mouth and the fabric overlap is at least about 60 mm.

4. An inflatable folded air bag cushion adapted to be mounted in a vehicle for restraining a vehicle passenger, the air bag being made of a flexible fabric and having a generally rectangular mouth with one pair of sides defining the width of the mouth, the folded air bag cushion including:

at least two longitudinal pleats defined by first fold lines extending parallel to the width of the mouth and second fold lines spaced from and parallel to the first fold lines, the longitudinal pleats having a length extending perpendicular to both the first and second fold lines;

the at least two longitudinal pleats further including a plurality of transverse pleats defined by third and fourth fold lines perpendicular to the first and second fold lines, the third and fourth fold lines corresponding to width ends of the mouth, the transverse pleats each extending generally the width of the mouth and for the length of the longitudinal pleats;

a roll formed in the transverse pleats having an axis parallel to the width of the mouth in part of the length of the longitudinal pleats, the roll being located adjacent the mouth of the air bag cushion; and the remainder of the length of the longitudinal pleats being formed into a loop and folded around the roll on an opposite side of the roll from the mouth of the air bag cushion.

5. An inflatable folded and rolled air bag cushion attached to a rigid housing adapted to be mounted in a vehicle for restraining a vehicle passenger, the air bag being made of a flexible fabric and having a generally rectangular mouth with one pair of sides defining the width of the mouth, said mouth width being substantially equal to the length of an opening in said housing, the folded air bag cushion including:

at least two longitudinal pleats defined by first fold lines extending parallel to and for the extent of the width of the bag mouth and second fold lines spaced from and parallel to the first fold lines, the longitudinal pleats having a length extending perpendicular to both the first and second fold lines;

the at least two longitudinal pleats further including a plurality of transverse pleats defined by third and fourth fold lines perpendicular to the first and second fold lines, the third and fourth fold lines corresponding to the length of the housing opening, the transverse pleats each extending generally the length of the housing opening and for the length of the longitudinal pleats;

a roll formed in the transverse pleats having an axis parallel to the width of the mouth, said roll being formed of only part of the length of the longitudinal pleats and being tightly positioned against the air bag cushion fabric at one side of the mouth of the air bag to provide an exposed portion of the roll which does not extend into the housing opening; and the remainder of the length of the longitudinal pleats being formed into a loop of unrolled fabric having an end that extends a predetermined distance from an edge of the housing opening, said loop end being folded inwardly toward the roll axis to contact only part of the exposed roll portion.

6. An air bag cushion as defined in claim 5 further having a protective cover secured to edges of said housing which tightly holds the rolled air bag fabric in place against the housing opening.

\* \* \* \* \*